United States Patent
Gray et al.

(10) Patent No.: US 7,950,254 B2
(45) Date of Patent: May 31, 2011

(54) METHOD AND SYSTEM FOR WASHING

(75) Inventors: Peter Gerard Gray, Brussels (BE); Graeme Duncan Cruickshank, Newcastle/Tyne (GB); Adam Costello, North Shields (GB); Michael Duncan, Morpeth (GB)

(73) Assignee: The Procter & Gamble Company, Cincinnati, OH (US)

( * ) Notice: Subject to any disclaimer, the term of this patent is extended or adjusted under 35 U.S.C. 154(b) by 1139 days.

(21) Appl. No.: 11/130,538

(22) Filed: May 17, 2005

(65) Prior Publication Data

US 2005/0252255 A1    Nov. 17, 2005

(30) Foreign Application Priority Data

| May 17, 2004 | (EP) | 04252838 |
|---|---|---|
| May 17, 2004 | (EP) | 04252845 |
| May 17, 2004 | (EP) | 04252846 |
| May 17, 2004 | (EP) | 04252849 |
| May 17, 2004 | (EP) | 04252851 |
| May 17, 2004 | (EP) | 04252853 |

(51) Int. Cl.
    *D06B 1/00*    (2006.01)
(52) U.S. Cl. .......... 68/3 SS; 68/18 F; 68/207
(58) Field of Classification Search .......... 68/3 SS, 68/13 A, 18 F; 134/111
    See application file for complete search history.

(56) References Cited

U.S. PATENT DOCUMENTS

| 2,212,872 A | * | 8/1940 | Barker ................. 74/70 |
| 3,007,478 A | * | 11/1961 | Leonhardt et al. ........... 134/57 R |
| 3,048,994 A | * | 8/1962 | Welter ............... 68/184 |

(Continued)

FOREIGN PATENT DOCUMENTS

EP    0 467 028 A    1/1992

(Continued)

OTHER PUBLICATIONS

"Capfil Nanofiltration Membrane NF50 M10", Feb. 20, 2003, XP002301175, 1 page.

*Primary Examiner* — Frankie L Stinson
(74) *Attorney, Agent, or Firm* — Julie A. McConihay; Leonard W. Lewis; Steven W. Miller (57) ABSTRACT

A washing system for use in cleaning or washing a soiled substrate or substrates, the system comprising:
a. a washing zone for contacting and washing the soiled substrate with wash liquor;
b. a feed supply for providing hot or cold feed water to the washing zone;
c. a wash liquor cleanup and recycle zone in fluid communication with the washing zone
d. an effluent storage and/or discharge zone; and optionally one or more of
e. a product dispensing zone;
f. means for sonically or ultrasonically treating the soiled substrate in the washing zone or in a washing pre-treatment zone;
g. an electrolysis zone for electrolysing the feed water or wash liquor;
h. a wash liquor disinfection zone; and
i. a feed water softening zone;

The wash liquor cleanup and recycle zone preferably comprises an ultrafiltration or microfiltration device having a cut-off in the range from about 1000 Daltons to about 1 μm, preferably from about 0.05 μm to about 0.5 μm, a lumen size of from about 1 to about 10 mm, preferably from about 2 to about 6 mm, more preferably from about 3 to about 5 mm, and a clean water flux of at least about 1000 L/m$^2$.h.100 kp (RO water at 25° C.), preferably at least about 10,000 L/m$^2$.h.100 kp.

6 Claims, 1 Drawing Sheet

U.S. PATENT DOCUMENTS

| | | | | |
|---|---|---|---|---|
| 3,615,024 A | * | 10/1971 | Michaels | 210/490 |
| 4,319,973 A | | 3/1982 | Porta et al. | |
| 4,710,233 A | * | 12/1987 | Hohmann et al. | 205/701 |
| 4,727,734 A | * | 3/1988 | Kanazawa et al. | 68/3 SS |
| 5,079,272 A | * | 1/1992 | Allegrezza et al. | 521/134 |
| 5,401,414 A | * | 3/1995 | Wack et al. | 210/651 |
| 5,452,594 A | * | 9/1995 | Kim et al. | 68/3 SS |
| 5,635,053 A | * | 6/1997 | Aoki et al. | 205/746 |
| 5,679,249 A | * | 10/1997 | Fendya et al. | 210/321.63 |
| 5,697,230 A | * | 12/1997 | Ender et al. | 68/3 SS |
| 5,823,016 A | * | 10/1998 | Glotz | 68/3 SS |
| 5,868,937 A | | 2/1999 | Back et al. | |
| 6,045,899 A | * | 4/2000 | Wang et al. | 428/315.7 |
| 6,562,296 B1 | * | 5/2003 | Tiarks et al. | 422/28 |
| 6,615,852 B1 | * | 9/2003 | Kitahara | 134/111 |
| 6,841,058 B2 | * | 1/2005 | Culvey et al. | 205/690 |
| 6,855,233 B2 | * | 2/2005 | Sawada | 204/263 |
| 7,000,437 B2 | * | 2/2006 | Raney et al. | 68/18 F |
| 2004/0159127 A1 | * | 8/2004 | Woo et al. | 68/13 A |

FOREIGN PATENT DOCUMENTS

| | | | |
|---|---|---|---|
| EP | 0 995 483 A1 | | 4/2000 |
| FR | 2 685 575 | * | 6/1995 |
| GB | 2 392 923 A | | 3/2004 |
| JP | 6-114179 | * | 4/1994 |
| JP | 06-182080 | * | 7/1994 |
| JP | 07-013115 | * | 1/1995 |
| JP | 11-018990 | * | 1/1999 |
| JP | 11-050300 | * | 2/1999 |
| JP | 2001-120875 | * | 5/2001 |
| JP | 2001-286698 | * | 10/2001 |
| JP | 2001-310164 | * | 11/2001 |
| JP | 2002113288 | | 4/2002 |
| JP | 2002-320934 | * | 11/2002 |
| JP | 2002-355624 | * | 12/2002 |
| JP | 2003-53339 | * | 2/2003 |
| JP | 2003-126592 | * | 5/2003 |
| JP | 2003220296 | | 8/2003 |
| WO | WO 02/057531 A | | 7/2002 |

\* cited by examiner

FIG. 1

METHOD AND SYSTEM FOR WASHING

CROSS REFERENCE TO RELATED APPLICATION

This application claims the benefit of EP Patent Application No. 04252849.7, filed May 17, 2004, EP Patent Application No. 04252846.3, filed May 17, 2004, EP Patent Application No. 04252838.0, filed May 17, 2004, EP Patent Application No. 04252853.9, filed May 17, 2004, EP Patent Application No. 04252851.3, filed May 17, 2004, EP Patent Application No. 04252845.5.

FIELD OF THE INVENTION

The present invention relates to methods and systems for use in cleaning or washing a soiled substrate or substrates. In particular it relates to methods and systems applicable in the field of domestic or institutional appliances such as laundry washing machines, automatic dishwashing machines, etc and which enable improved cleaning of a soiled substrate or substrates across the range of detergent usage levels. The invention also relates to methods and systems enabling more efficient usage of water, energy and detergent product resources.

BACKGROUND OF THE INVENTION

In recent years there has been growing interest in a variety of non-detergent based technologies for washing laundry and other soiled substrates. For example, a number of washing machines have been launched on the Japanese and Asian markets that make use of electrolysis, ultrasonic or cavitation techniques to promote the cleaning or disinfection of laundry. Typically, such machines include at least one wash cycle characterized as 'detergent-free' and which is designed for the washing of laundry that is relatively lightly soiled. As the washing machine manufacturers themselves make clear, however, the machines and systems currently on the market are of limited value for the washing of more heavily soiled or stained items where the use of a surfactant-based detergent product continues to be necessary to achieve acceptable cleaning performance. Accordingly, such machines are designed and marketed for so-called 'hybrid' use with non-detergent and detergent wash-cycles being selectable according to the severity of the laundering task.

In terms of overall resource utilization, the non-detergent based cleaning technologies may have the potential to save on detergent product usage in light soil situations, but such savings are offset to a lesser or greater extent by the operational need for higher water and energy utilization. Thus the resource equation is finely balanced.

It clearly would be desirable to enhance the efficacy of current washing machines and systems, including the newer 'hybrid' machines, so as to deliver improved washing performance across the full range of detergent usage levels. It would also be desirable to deliver performance improvements in the context of an overall efficient and sustainable utilization of resources—chemical, water and energy.

It is an object of the present invention to provide methods and systems applicable in the field of domestic or institutional appliances such as laundry washing machines, automatic dishwashing machines, etc and which enable improved cleaning of a soiled substrate or substrates across the range of detergent usage levels. It is a further object of the invention to provide washing methods and systems enabling more efficient usage of water, energy and detergent product resources.

SUMMARY OF THE INVENTION

According to a first aspect of the present invention, there is provided a washing system for use in cleaning or washing a soiled substrate or substrates, the system comprising a washing zone for contacting and washing the soiled substrate with wash liquor; a feed supply for providing hot or cold feed water to the washing zone; an effluent storage and/or discharge zone; and a wash liquor cleanup and recycle zone in fluid communication with the washing zone. Optionally the washing system can also include one or more of the following: a product dispensing zone (sometimes referred to herein as 'the dispensing zone'); means for sonically or ultrasonically treating the soiled substrate in the washing zone or in a washing pre-treatment zone; an electrolysis zone for electrolysing the feed water or wash liquor; a wash liquor disinfection zone; and a feed water softening zone. The washing zone can be dual purpose and also function as a post-wash rinsing zone; alternatively the wash system can optionally comprise a separate post-wash rinsing zone. In preferred embodiments, the washing zone is a high efficiency washing zone capable of providing a level of mechanical action in the range of from about 50% to about 65%, more preferably from about 53% to about 60% stain removal according to the herein described stain removal test.

Unless otherwise clear from the context, the term 'product' as used herein encompasses both active-based detergent compositions suitable for washing and cleaning of soiled substrates as well as auxiliary compositions suitable for use after washing or in conjunction with active-based detergents and designed to provide an ancillary substrate benefit or effect, for example, finishing agents, rinsing agents, fabric enhancers designed to provide post-wash fabric care benefits, and detergent auxiliaries designed to provide post-wash surface care benefits. The terms 'product dispensing zone', 'product storage means' etc should be construed accordingly.

In preferred systems and methods of the invention, the wash liquor cleanup and recycle zone comprises a wash liquor filtration device, preferably an ultrafiltration or microfiltration device. The filtration device preferably has a cut-off in the range from about 1000 Daltons to about 1 µm, more preferably from about 0.05 µm to about 0.5 µm. The filtration device preferably comprises one or more tubular membranes, the lumen size of each membrane being preferably from about 1 to about 10 mm, more preferably from about 2 to about 6 mm, and especially from about 3 to about 5 mm. The filtration device preferably has a clean water flux of at least about 1000 L/m$^2$.h.100 kp (RO water at 25° C.), more preferably at least about 10,000 L/m.h.100 kp. The cut-off herein refers to the nominal pore size rating of the membrane of the device except that the overall minimum value (1000 Daltons) is given in terms of molecular weight cut-off. Lumen size refers to the minimum internal diameter of the membrane.

Figure 1:
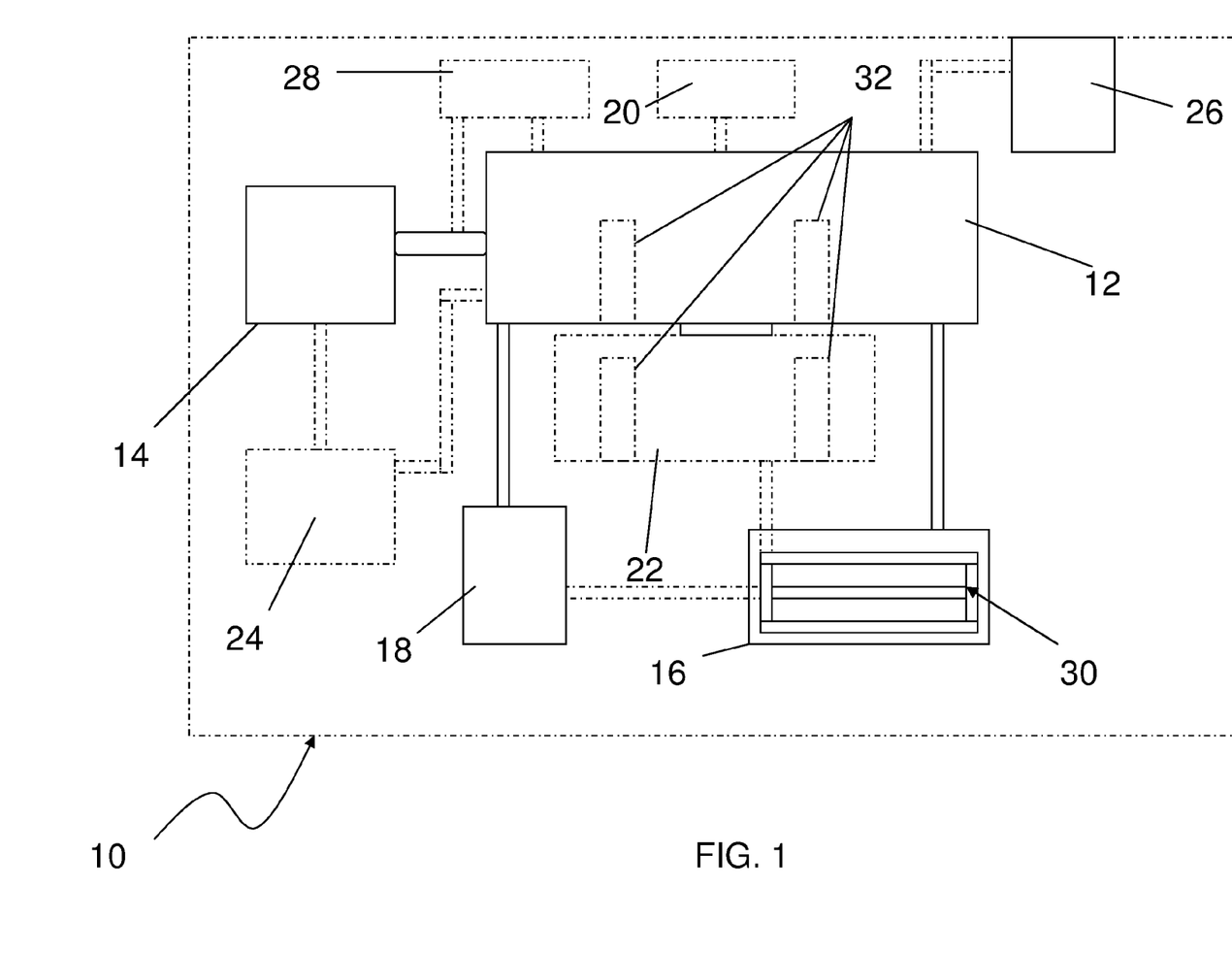
FIG. 1 is a schematic drawing of the washing system in accordance with one embodiment of the present invention.

Thus according to this aspect of the invention, there is provided a washing system 10 and a method for cleaning or washing a soiled substrate or substrates using a washing system 10, the system comprising:

a. a washing zone 12 for contacting and washing the soiled substrate with wash liquor;

b. a feed supply 14 for providing hot or cold feed water to the washing zone 12;

c. a wash liquor cleanup and recycle zone 16 in fluid communication with the washing zone 12;
d. an effluent storage and/or discharge zone 18; and optionally one or more of
e. a product dispensing zone 20;
f. means for sonically or ultrasonically treating the soiled substrate in the washing zone 12 or in a washing zone pre-treatment zone 22;
g. an electrolysis zone 24 for electrolyzing the feed water or wash liquor;
h. a wash liquor disinfection zone 26; and
i. a feed water softening zone 28;

and wherein the wash liquor cleanup and recycle zone 16 comprises an ultrafiltration or microfiltration device 30 having a cut-off in the range from about 1000 Daltons to about 10 μm, preferably from about 0.05 μm to about 0.5 μm, a lumen size of from about 1 to about 10 mm, preferably from about 2 to about 6 mm, more preferably from about 3 to about 5 mm, and a clean water flux of at least about 1000 L/m$^2$.h.100 kp (RO water at 25° C.), preferably at least about 10,000 L/m$^2$.h.100 kp. The means for sonically or ultrasonically treating the soiled substrate in the washing zone or in a washing pre-treatment zone may comprise one or more vibrating cleaning transducers 32 for physically contacting one or more surfaces of the soiled substrate. The method of cleaning or washing a soiled substrate or substrates using the system comprises a wash liquor clean up and recycle step which in turn comprises the step of recycling the wash liquor through the ultrafiltration or microfiltration device.

In certain embodiments herein, cleaning of the wash liquor can be performed as a separate batch operation on bulk liquor at an off-line location, but preferably cleaning is performed on a stream of the wash liquor within a recycle loop section of the washing system. Alternatively cleaning can take place within a section or sub-zone of the washing zone itself. The term 'cleaning' refers to a reduction in the soil content of the wash liquor (either the bulk liquor or the wash liquor stream as appropriate), soil content being measured, for example, by means of turbidity. Preferably the turbidity of the recycled wash liquor is less than about 15 NTU, more preferably less than about 5 NTU.

After cleaning, the liquor is recycled back to the washing zone where it can be used in the same or a subsequent washing step or in a post-wash rinsing step. In preferred embodiments of this type, the wash liquor is recycled to the washing zone during or at the end of an essentially detergent-free prewash step prior to a detergent-assisted, preferably a bleach-assisted washing step. Prewash embodiments of the invention are particularly valuable herein in the case of bleach-assisted substrate washing steps from the viewpoint of providing improved bleaching and cleaning performance. Preferably, the washing system is arranged to provide continuous or semi-continuous cleanup and recycle of wash liquor during the same substrate washing step, in other words, the wash liquor is recycled continuously or in one or more phases of operation during the washing or prewashing step so as to remove soil from the washing zone and reduce or minimize soil redeposition onto the substrate. By 'essentially-free' of detergent is meant a wash liquor containing less than about 0.1% of detergent product by weight of the wash liquor.

In preferred embodiments the wash liquor cleanup and recycle zone is effective to lower the turbidity of the recycled wash liquor to less than about 15 NTU, preferably less than about 5 NTU. The permeate flux of the wash liquor cleanup and recycle zone, on the other hand, is preferably at least about 100 L/h, more preferably at least about 500 L/h when operating at a pressure in the range from about 100 to about 1000 kP (1-10 bar), preferably from about 100 to about 400 kP (1-4 bar). The surface area of the membrane is preferably from about 0.01 to about 2 m$^2$, more preferably from about 0.05 to about 1 m$^2$, especially from about 0.25 to about 0.75 m$^2$.

Highly preferred herein is a wash liquor cleanup and recycle zone that comprises a cross-flow filtration device. Preferably the cross-flow filtration device comprises one or more free-standing, asymmetric, tubular filtration membranes, each tubular membrane having a lumen size having the dimensions described above. In preferred embodiments, the device comprises a series of intercommunicating membrane subunits, each subunit being in the form of a bundle comprising one or more, preferably from about 2 to about 20, more preferably from about 5 to about 15 of the tubular filtration membranes. Where the device comprises a plurality of subunits in series, the individual subunits can be interconnected by one or more sections of tubular membrane having a larger lumen size. The total path length of tubular membrane in the device is preferably from about 10 to about 250 m, more preferably from about 35 to about 150 m and the pressure drop from the inlet to the outlet of the device is preferably less than about 2 bar, more preferably less than about 1 bar, and especially from about 0.2 to about 0.5 bar. Furthermore each tubular membrane preferably has a Reynold's Number of at least about 2300, preferably at least about 4000 at an operating pressure in the range from about 100 to about 1000 kP (1-10 bar), preferably from about 100 to about 400 kP (1-4 bar).

The cross-flow filtration device is provided with wash liquor input and permeate and retentate outlet ports, the permeate outlet port being in fluid communication with the washing zone and the retentate outlet port being in fluid communication with a wash liquor buffer zone or with the effluent discharge zone.

In systems employing a wash liquor buffer zone, wash liquor is fed or drawn from the washing zone to the buffer zone along a first conduit and is then fed under pressure with the aid of a pump along a second conduit from the buffer zone to the inlet port of the cross-flow filtration device. A conventional coarse filter designed to remove particles of greater than about 20 microns, for example activated carbon, can also be provided upstream of the cross-flow filtration device for removal of larger size impurities. The resulting retentate is then recirculated to the buffer zone with permeate being returned to the washing zone. A pressure relief valve can also be provided on the inlet port of the cross-flow filtration device, excess pressure being relieved by drainage into the buffer zone or effluent discharge zone. In one embodiment, the buffer zone is closed to the atmosphere in which case wash liquor is automatically drawn into the buffer zone in tandem with the removal of permeate to the washing zone. Alternatively the buffer zone can be vented to atmosphere and the wash liquor fed under pressure from the washing zone to the buffer zone. Relief valves can also be positioned on the retentate outlet and on the inlet and outlet sides of the buffer zone. A valve, for example a pinch valve, can also be provided on the permeate outlet port of the filtration device to enable intermittent clean-sweeping or back-flushing of the filtration membrane. However, it is a feature of the systems of the invention that they require minimal maintenance in the form of back-flushing or defouling procedures.

The filtration device preferably takes the form of a module comprising a filter housing provided with a membrane compartment in which the tubular filtration membrane or membranes are mounted, the ends of which are encased in membrane holders and communicate with the inlet and retentate outlet ports. Where the device comprises a series of intercommunicating membrane subunits, each subunit generally comprises a bundle of tubular membranes, a pair of membrane holders for encasing the ends of the tubular membranes and an outer sheath provided with one or more openings to allow discharge of permeate into the membrane compartment of the filter housing. The individual membrane subunits can intercommunicate via one or more sections of interconnecting tubular membrane having a lumen size generally greater than that of the individual subunits. The terminal subunits of the series, on the other hand, can communicate with the inlet and retentate outlet ports via one or more sections of tubular membrane and corresponding membrane holders set into the membrane housing. The filter housing is also provided with one or more openings in the wall of the filter housing communicating with the permeate outlet port or ports. Wash liquor enters the filter housing via a connection into the inlet port and then passes through the filtration membrane or membranes, the resulting retentate and permeate being discharged through connections into the corresponding retentate and permeate outlet ports.

A wide range of membrane materials can be employed herein for the ultrafiltration or microfiltration device including polypropylene, polyvinylidene difluoride, cellulose acetate, cellulose, polypropylene, polyacrylonitrile, polysulfones, polyarylsulphones, polyethersulphones, polyvinyl alcohol, polyvinyl chloride, polycarbonate, aliphatic and aromatic polyamides, polyimides and mixtures thereof. Preferred herein however is an asymmetric polyethersulphone membrane having a nominal pore size ratio (inner to outer surface) of about 1:10 and a surface energy (inner surface) of about 8 dynes/cm.

In one application of the invention, the washing systems herein additionally comprise a so-called 'high efficiency' washing zone, i.e a washing zone that is designed for contacting and washing the soiled substrate with wash liquor under high efficiency wash conditions. In particular it has been found herein that the combination of high efficiency wash conditions with wash liquor cleanup and recycle is particularly valuable for providing improved cleaning, stain removal and whiteness maintenance of substrates including across the range of detergent usage levels.

Thus according to this aspect of the invention, there is provided a washing system and a method for use in cleaning or washing a soiled substrate or substrates, the system comprising:
  a. a washing zone for contacting and washing the soiled substrate with wash liquor in a high efficiency substrate washing step;
  b. a feed supply for providing hot or cold feed water to the washing zone;
  c. an effluent storage and/or discharge zone; and optionally one or more of
  d. a product dispensing zone;
  e. means for sonically or ultrasonically treating the soiled substrate in the washing zone or in a washing pre-treatment zone;
  f. an electrolysis zone for electrolysing the feed water or wash liquor;
  g. a wash liquor disinfection zone; and
  h. a feed water softening zone;
and wherein the washing system additionally comprises a wash liquor cleanup and recycle zone in fluid communication with the washing zone.

In the case of washing systems that additionally comprise a high efficiency washing zone, a preferred method of the invention comprises the combination of i) a washing step wherein the soiled substrate is contacted with wash liquor under high efficiency wash conditions and ii) a wash liquor cleanup and recycle step wherein the wash liquor is cleaned and thereafter recycled to the washing zone, preferably through an ultrafiltration or microfiltration device as described herein. Preferably the substrate is contacted with wash liquor under high efficiency conditions while simultaneously performing cleanup and recycle of the wash liquor.

As used herein, the terms 'high efficiency washing step', 'high efficiency wash conditions' and 'high efficiency washing zone' refer to the level of cleaning performance delivered by the washing system as the result of normal mechanical agitation processes within the washing zone. In other words, this excludes the contribution to cleaning performance resulting from chemical, electrochemical or photochemical processes, from high energy mechanical processes such as ultrasonics or cavitation techniques, or from water cleanup and recycling processes involving filtration and the like. The level of cleaning due to mechanical processes is sometimes referred to herein as the 'mechanical action' of the washing zone. The mechanical action of a washing zone depends upon many different parameters including 1) machine parameters, for example the type of washing machine, whether the machine is a horizontal or vertical axis machine, the number of drums, the size, shape and baffle arrangement of the drums, the use of secondary low pressure spray systems, etc; and 2) operational parameters dependent upon cycle selection, for example the rotational speed and rotational pattern of the drums, the power consumption of the wash process, the water level, the rate and pattern of movement through the wash liquor, the number of drum revolutions/cycle, etc. As used herein, the mechanical action of the washing zone is quantified in terms of the stain removal performance delivered in a nil-detergent context using a set of standard stained cotton swatches under certain usage conditions. In particular a 'high efficiency' washing zone is defined herein as a washing zone which delivers or is capable of delivering a minimum level of mechanical action in one or more cool temperature (20° C. to 40° C.) main wash cycles of the washing system. Fabrics that are laundered in the washing zone are said to be subject to high efficiency wash conditions. The minimum level of mechanical action required herein for high efficiency corresponds to at least about 47% stain removal under test conditions as described hereinbelow. In preferred embodiments, the mechanical action is set at somewhat higher levels in the range from about 50% to about 65%, more preferably from about 53% to about 60% stain removal, the upper limits being set by fabric care considerations.

The stain removal test conditions are as follow:

EMPA 101-104 stain set—pure woven cotton swatches stained with particulate (carbon black/mineral oil), enzymatic (blood), greasy (chocolate/milk) and bleachable (red wine) soils according to IEC 60456 Edition 4, Annex E; 8 replicates per appliance; ballast load—3 kg clean laundry; water hardness—6 degrees English Clark; data analysis via image analysis calibrated vs MacBeth 24 Chip Color Chart; stain removal increase (SRI) averaged over the stain set.

In another application of the invention, the washing systems herein additionally comprise means for sonically or ultrasonically treating the soiled substrate in the washing zone or in a washing pre-treatment zone. In particular it has been found herein that the combination of sonic or ultrasonic treatment with wash liquor cleanup and recycle is particularly valuable for providing improved cleaning of substrates across the range of detergent usage levels. Preferably the means for sonically or ultrasonically treating the soiled substrate comprises a sonic or ultrasonic energy generator or a plurality of such generators wherein the frequency of the generated energy is in the range from about 1 kHz to about 150 kHz, preferably from about 20 kHz to about 80 kHz and the power input to the generator is in the range from about 0.1 W to about 500 W, preferably from about 10 W to about 250 W.

Thus according to this aspect of the invention, there is provided a washing system and a method for use in cleaning or washing a soiled substrate or substrates, the system comprising:

a. a washing zone for contacting and washing the soiled substrate with wash liquor in a washing step;
b. means for sonically or ultrasonically treating the soiled substrate in the washing zone or in a washing pre-treatment zone;
c. a feed supply for providing hot or cold feed water to the washing zone and/or pre-treatment zone;
d. an effluent storage and/or discharge zone; and optionally one or more of
e. a product dispensing zone;
f. an electrolysis zone for electrolysing the feed water or wash liquor;
g. a wash liquor disinfection zone; and
h. a feed water softening zone;

and wherein the washing system additionally comprises a wash liquor cleanup and recycle zone in fluid communication with the washing zone.

In the case of washing systems that additionally comprise means for sonically or ultrasonically treating the soiled substrate in the washing zone or in a washing pre-treatment zone, a preferred method of the invention comprises the combination of i) a washing step wherein the soiled substrate is contacted with wash liquor while simultaneously being subjected to sonic or ultrasonic treatment and ii) a wash liquor cleanup and recycle step wherein the wash liquor is cleaned and thereafter recycled to the washing zone or to a post-wash rinsing zone, preferably through an ultrafiltration or microfiltration device as described herein. Preferably the substrate is contacted with wash liquor and subjected to sonic or ultrasonic treatment while simultaneously performing cleanup and recycle of the wash liquor.

In one embodiment, the energy generator is adapted for generating and supplying ultrasonic energy to the soiled substrate within the washing zone. In such an embodiment, the frequency of the generated energy is preferably in the range from about 20 kHz to about 150 kHz, more preferably from about 20 kHz to about 80 kHz, and the power input to the generator is preferably in the range from about 20 W to about 500 W per gallon of wash liquor (5.28 W to 132.1 W per liter), more preferably from about 25 W to about 250 W per gallon of wash liquor (6.6 W to 66.1 W per liter) in the washing zone. An energy generator suitable for use in such embodiments comprises an ultrasound transducer and an electronic power supply. The ultrasound transducer can be either a PZT (Lead-Zirconate-Titanite) transducer or a magnetostrictive transducer. Examples of the commercial ultrasound transducers include Vibra-Cell VCX series from Sonics & Materials Inc, and Tube Resonator from Telsonic AG. Single or array of several transducers can be used in the washing system. The transducer(s) can be mounted at the bottom or on the sidewall surrounding the washing zone. It can also be submersed directly in the washing zone. The transducers can also be mounted within the washing machine drum or tub as described in detail below.

In a preferred embodiment of this type, the washing system takes the form of a front-loading washing machine comprising a drum for accommodating the laundry, the drum having one or more, preferably two to four, more preferably three baffles on the inner circumferential wall thereof for tumbling the laundry. The washing machine also comprises one or more sonic or ultrasonic generators mounted on at least one and preferably on each baffle of the drum so that sonic or ultrasonic energy is applied to the laundry as the laundry items are lifted out of the bulk wash liquor in contact with the corresponding baffle. In another embodiment of this type, the washing system takes the form of a top-loading washing machine having a central agitator paddle having one or more sonic or ultrasonic generators mounted thereon.

In an alternative embodiment, the energy generator is adapted for generating and supplying sonic or ultrasonic energy to the soiled substrate within the washing pre-treatment zone. In such an embodiment, the frequency of the generated energy is preferably in the range from about 1 kHz to about 80 kHz, more preferably from about 20 kHz to about 60 kHz, and the power input to the generator is preferably in the range from about 0.1 W to about 80 W, more preferably from about 1 W to about 40W. An energy generator suitable for use in such embodiments comprises one or more vibrating cleaning transducers adapted to physically contact one or more surfaces of the soiled substrate. In use, the soiled substrate is passed under or between the cleaning transducers, the substrate being simultaneously or previously wetted with wash liquor. The cleaning transducer can be mounted in a convenient position outside the washing zone and provided with means to enable drainage of the wash liquor into the washing zone. The systems and methods of the invention can also include embodiments that combine the energy generator for the washing zone and the energy generator for the washing pre-treatment zone with frequencies and power inputs as described above.

In a further application of the invention, the washing systems herein additionally comprise an electrolysis zone for electrolysing the feed water or wash liquor for purposes of generating electrolytically-activated wash liquor and/or rinse liquor. In particular it has been found herein that the combination of electrolysis with wash liquor cleanup and recycle is particularly valuable for providing improved cleaning of substrates across the range of detergent usage levels. The electrolysis zone herein preferably comprises electrolysis means provided with at least a pair of electrodes for electrolysing the feed water or wash liquor, the electrolysis means being referred to respectively as feed water electrolysis means and wash water electrolysis means. Generally the feed water electrolysis means is disposed intermediate the feed supply and washing zone, while the wash liquor electrolysis means is disposed within the washing zone or within the wash liquor recycle zone. A combination of feed water and wash liquor electrolysis means is also envisaged herein. Optionally, the electrolysis zone can also comprise a reservoir (the electrolysis reservoir) for storage of the resulting electrolysed water, and means for storage and dispensing of electrolyte or other oxidant-precursor species into the feed water or wash liquor.

In terms of function, electrolysis zones suitable for use herein include both oxidant-generating and pH-generating electrolysis zones. In oxidant-generating embodiments of the invention, the feed water or wash liquor comprises in use one or more oxidant-precursor species and the electrolysis zone comprises means for generating one or more streams of oxidant or mixed-oxidant species in the feed water or wash liquor by electrolysis of the oxidant-precursor species.

In a pH-generating embodiments of the invention, the electrolysis zone comprises means for generating one or more streams of acidic and/or alkaline species in the feed water or wash liquor, said one or more streams being supplied to the washing zone for use in the substrate washing step or in a subsequent substrate rinsing step.

Thus according to this aspect of the invention, there is provided a washing system and a method for use in cleaning or washing a soiled substrate or substrates, the system comprising:
- a. a washing zone for contacting and washing the soiled substrate with wash liquor in a substrate washing step;
- b. a feed supply for providing hot or cold feed water to the washing zone;
- c. an electrolysis zone for electrolysing the feed water or wash liquor;
- d. an effluent storage and/or discharge zone; and optionally one or more of
- e. a product dispensing zone;
- f. means for sonically or ultrasonically treating the soiled substrate in the washing zone or in a washing pre-treatment zone;
- g. a wash liquor disinfection zone; and
- h. a feed water softening zone;

and wherein the washing system additionally comprises a wash liquor cleanup and recycle zone in fluid communication with the washing zone.

By 'electrolytically-activated wash liquor' is meant wash liquor that has been subjected to electrolysis, e.g. to generate oxidant, mixed oxidant, acidic or alkaline species, or wash liquor derived from feed water that has been subjected to electrolysis. The term 'electrolytically-activated rinse liquor' on the other hand refers to rinse liquor derived from feed water or wash liquor that has been subjected to electrolysis.

In the case of washing systems that additionally comprise an electrolysis zone, a preferred method of the invention comprises i) an electrolysis step wherein the feed water or wash liquor is electrolysed to generate electrolytically-activated wash liquor and optionally electrolytically-activated rinse liquor, ii) a washing step wherein the soiled substrate is contacted with the electrolytically-activated wash liquor, iii) an optional post-wash rinsing step wherein the substrate is contacted with the electrolytically-activated rinse liquor, and iv) a wash liquor cleanup and recycle step wherein the electrolytically-activated wash liquor is cleaned and thereafter recycled to the washing zone, preferably through an ultrafiltration or microfiltration device as described herein. Preferably the substrate is contacted with electrolytically-activated wash liquor while simultaneously performing cleanup and recycle of the wash liquor.

In another application of the invention, the washing systems herein additionally comprise a wash liquor disinfection zone. In particular it has been found herein that the combination of wash liquor disinfection with wash liquor cleanup and recycle is particularly valuable for providing improved cleaning of substrates across the range of detergent usage levels.

The disinfection zone for use in the systems and methods of the invention can take a number of different forms. In a first embodiment, the disinfection zone comprises an antibacterial agent (which term herein includes both bactericidal and bacteriostatic agents) and means for delivering the antibacterial agent to the wash liquor. Preferably the antibacterial agent comprises one or more oxidant or bleaching species such as ozone, hypochlorous acid or one or more antibacterial metal ion sources inclusive of silver, copper, zinc, tin and compounds thereof as well as combinations of said antibacterial ion sources with inorganic carrier materials. In a preferred embodiment of this type, the disinfection zone comprises an electrolytic source of an antibacterial agent such as silver, copper, zinc or tin ions or of an active oxidant or bleaching species such as hypochlorous acid. In another embodiment, the disinfection zone comprises a photocatalyst and/or UV source. In such embodiments, the photocatalyst and/or UV source can be associated with an ultrafiltration or microfiltration device for purposes of cleaning and disinfecting both the filtration device and the wash liquor.

Thus according to this aspect of the invention, there is provided a washing system and a method for use in cleaning or washing a soiled substrate or substrates, the system comprising:
- a. a washing zone for contacting and washing the soiled substrate with wash liquor in a substrate washing step;
- b. a feed supply for providing hot or cold feed water to the washing zone;
- c. a wash liquor disinfection zone;
- d. an effluent storage and/or discharge zone; and optionally one or more of
- e. a product dispensing zone;
- f. means for sonically or ultrasonically treating the soiled substrate in the washing zone or in a washing pre-treatment zone;
- g. an electrolysis zone for electrolysing the feed water or wash liquor; and
- h. a feed water softening zone;

and wherein the washing system additionally comprises a wash liquor cleanup and recycle zone in fluid communication with the washing zone.

In the case of washing systems that additionally comprise a wash liquor disinfection zone, a preferred method of the invention comprises the combination of i) a disinfection step wherein the wash liquor is treated with an antibacterial agent, photocatalyst or UV source, ii) a washing step wherein the soiled substrate is contacted with the treated wash liquor, and iii) a wash liquor cleanup and recycle step wherein the wash liquor is cleaned and thereafter recycled to the washing zone, preferably through an ultrafiltration or microfiltration device as described herein. Preferably the substrate is contacted with the wash liquor while simultaneously disinfecting and performing cleanup and recycle of the wash liquor.

In a further application of the invention, the washing systems herein additionally comprise a water-softening zone. In particular it has been found herein that the combination of water-softening with wash liquor cleanup and recycle is particularly valuable for providing improved cleaning of substrates across the range of detergent usage levels. In the systems and methods of the invention, the water-softening zone comprises one or more feed water softening devices, preferred devices being selected from nanofiltration, electrodeionisation, electrodialysis, reverse-osmosis and ion-exchange water-softening devices and combinations thereof. Highly preferred are the water-softening systems disclosed in European patent application 04252837.2 in the name of Baeck, Convents and Smets, said application being incorporated by reference herein and described in detail below. The feed water softening device is preferably effective to soften the water to a residual $Ca^{2+}$ hardness of 1 mmol/L or less with a soft water flux of at least about 2 L/h, preferably at least about 10 L/h at a feed water pressure in the range from about 100 to about 1000 kP (1-10 bar), preferably from about 100 to about 400 kP (1-4 bar).

Thus according to this aspect of the invention, there is provided a washing system and a method for use in cleaning or washing a soiled substrate or substrates, the system comprising:
- a. a washing zone for contacting and washing the soiled substrate with wash liquor in a substrate washing step;
- b. a feed supply for providing hot or cold feed water to the washing zone;

c. a water-softening zone intermediate the feed supply and washing zone;
d. an effluent storage and/or discharge zone; and optionally one or more of
e. a product dispensing zone;
f. means for sonically or ultrasonically treating the soiled substrate in the washing zone or in a washing pre-treatment zone;
g. an electrolysis zone for electrolysing the feed water or wash liquor; and
h. a wash liquor disinfection zone;

and wherein the washing system additionally comprises a wash liquor cleanup and recycle zone in fluid communication with the washing zone.

In the case of washing systems that additionally comprise a feed water softening zone, a preferred method of the invention comprises the combination of i) a water softening step wherein the feed water is softened in the water softening zone, ii) a washing step wherein the soiled substrate is contacted with wash liquor derived from the softened feed water, and iii) a wash liquor cleanup and recycle step wherein the wash liquor is cleaned and thereafter recycled to the washing zone, preferably through an ultrafiltration or microfiltration device as described herein. Preferably the substrate is contacted with the wash liquor while simultaneously performing cleanup and recycle of the wash liquor.

In a preferred embodiment, the water softening zone comprises a feed water filtration device. Especially preferred is a nanofiltration device having a cut-off in the range from about 100 to about 1000 Daltons, preferably from about 200 to about 1000 Daltons. The clean water flux of the device, on the other hand, is preferably at least 3, more preferably at least 6 $L/m^2.h.100$ kp (RO water at 25° C.). The device preferably has a magnesium ion rejection of at least 50%, more preferably at least 80% (0.35 wt % $MgSO_4$, 600 kP, Re=2500, 25° C.).

Preferably, the water-softening zone takes the form of a cross-flow filtration device having permeate and retentate outlet ports, the permeate outlet port being in fluid communication with the washing zone and the retentate outlet port being in fluid communication with one or more of the effluent storage, discharge and wash liquor-cleanup and recycle zones.

More especially, filtration devices preferred for use herein are cross-flow devices provided with mains feed water input, retentate recirculation, hard-water effluent bleed and optional recirculation pump. Preferably the flux ratio of soft-water permeate to hard-water effluent is at least about 1:1, preferably at least about 3:1, more preferably at least about 5:1, and especially at least about 8:1.

Such filtration devices preferably take the form of a module comprising a filter housing provided with a membrane compartment in which is mounted a bundle of capillary or tubular filtration membranes, the ends of which are encased in membrane holders and which communicate with one or more inlet ports and one or more retentate outlet ports. The filter housing is also provided with one or more openings in the wall of the filter housing and which communicate with one or more permeate outlet ports. Hot or cold water from the feed supply enters the filter housing via a connection into the inlet port and then passes through the capillary or tubular filtration membranes, the resulting retentate and permeate being discharged through connections into the corresponding retentate and permeate outlet ports. Such an arrangement is referred to herein as an 'inside-out' arrangement.

Alternatively, the module can be operated in reverse manner ('outside-in') wherein the feed water is supplied and the retentate discharged via openings in the wall of the filter housing communicating with corresponding inlet and retentate outlet port connections. In this case permeate is collected within the filtration membranes and discharged via their open ends and corresponding permeate outlet port connections.

The module can also be provided with one or more distributor pipes placed transverse to the direction of the filtration membranes with one or more openings into the membrane compartment in order to reduce the transverse forces on the filtration membranes, such an arrangement being described in detail in WO-A-98/20962.

Preferred for use herein is a filtration device or module based on a polyamide/polyethersulfone nanofiltration membrane developed for inside-out filtration marketed by X-Flow B.V. under the designation NF50M10.

Nanofiltration membranes can be prone to degradation or attack by chlorine in feed water. Accordingly the filtration device may be used in conjunction with a chlorine removal system such as a carbon prefilter, an antioxidant or brass in order to extend the working life of the device.

In filtration device embodiments, the filtration device preferably also comprises a pump for recirculating the retentate stream through the filtration module under elevated pressure, the pump either being situated in the recirculation loop with the sole or primary purpose of retentate recirculation or else being operatively connected to the main discharge pump of the washing appliance or washing zone.

In other preferred embodiments, the water-softening zone comprises an electrodialysis or electrodeionisation device. In electrodialysis, cation-exchange membranes are alternatively stacked with anion-exchange membranes and the resulting compartmentalized array is placed between two oppositely-charged electrodes. Feed water is fed into the device under low pressure and circulated between the membranes. On application of direct current to the electrodes, cations and anions move in opposite directions towards the cathode and anode respectively and concentrate in alternate compartments. The soft water output from the device is then fed to the washing zone and the hard water effluent fed to one or more of the effluent storage, discharge and wash liquor-cleanup and recycle zones.

Electrodeionisation is in effect a combination of electrodialysis with ion exchange. In this case a mixture of cation- and anion-exchange resins are introduced between the cation- and anion-exchange membranes and all ionic species in the feed water are trapped within the resin. The soft water output is then fed to the washing zone whereupon the device undergoes an electrochemical regeneration cycle in which the cation- and anion-exchange resins are regenerated for subsequent use. The resulting the hard water effluent is then fed to one or more of the effluent storage, discharge and wash liquor-cleanup and recycle zones.

In the systems and methods of the invention, the feed supply supplies water directly from the mains, from a mains or used-water reservoir such as a recycle reservoir as described herein below, or from a combination thereof.

Downstream of the water-softening zone and in fluid communication therewith, the washing system can additionally comprise an inlet reservoir for storing and delivering hot or cold softened mains water to the washing zone.

In systems and methods of the invention comprising a post-wash rinsing zone separate to the washing zone, the feed supply and inlet reservoir can additionally serve to supply hot or cold softened water to the rinsing zone. Similarly, the water-softening zone, and in particular the permeate outlet port of the filtration device, can also be in fluid communication with the rinsing zone.

The washing systems of the invention can take the form of an integral water-softening and washing appliance wherein the water-softening zone and washing zone are built into and form part of a single appliance with the two zones in fluid communication with one another via the conduits of the appliance. In preferred embodiments, however, the washing system comprises a water-softening appliance and a washing appliance in hyphenated form, whereby the water-softening appliance and its associated water-softening zone forms a stand-alone unit that can be either permanently or temporarily fitted to the feed water inlet conduits of the washing appliance as required by the user, any power supply required for the water-softening appliance being taken either from the power supply for the washing appliance or separately from the mains power supply.

The washing systems of the invention preferably also comprise a product dispensing zone which in preferred embodiments is situated intermediate the water-softening zone, if present, and the washing zone. The product dispensing zone preferably comprises means for dosing detergent and/or detergent auxiliary product into the feed water within or on the feed water inlet to the washing zone and/or post-wash rinsing zone, if present, and may also comprise product storage means for bulk detergent and/or detergent auxiliary product.

In addition, the product dispensing zone can also comprise means enabling filling, refilling or replacement of the product storage means and may in addition comprise valves, dispensing orifices or other means for controlling the dosing rate of the detergent and/or detergent auxiliary product relative to the soft water flux of the water-softening zone. Preferably the dispensing and water-softening zones are serially-connected or comprise an integral water-softening and product-dispensing unit, i.e. a unit having separate but interconnected water-softening and product-dispensing zones, the product-dispensing zone being downstream of the water-softening zone and comprising means for dosing product into the feed water on the output side of the water-softening zone.

According to the methods of the invention, the wash liquor can be recycled to the washing zone during or at the end of the washing step for use in a subsequent washing step or in a post-wash rinsing step. In a preferred embodiment of this type, the wash liquor is recycled to the washing zone during or at the end of an essentially detergent-free prewash step prior to a detergent-assisted, preferably a bleach-assisted washing step. In such embodiments there can also be included a recycle reservoir for storing the cleaned wash liquor prior to recycling.

Preferably the substrate is contacted with the wash liquor while simultaneously performing cleanup and recycle of the liquor. In such embodiments, it can be advantageous to perform cleanup and recycle in one or more phases of operation during the (preferably high efficiency) substrate washing step. For example, in one embodiment, cleanup and recycle is initiated in the final half of the washing step, for example, after completion of about 50%, preferably at least about 70% or even about 90% of the washing step. Alternatively cleanup and recycle is initiated only after the system has reached its optimum washing temperature or after the wash liquor has reached a threshold turbidity or conductivity value or a threshold value of soil. For this purpose, the washing system can be provided with one or more sensors responsive to the turbidity, conductivity or soil level of the wash liquor and which acts as a trigger for initiating cleanup and recycle.

In another preferred embodiment which is especially useful for the laundering of fabrics, the wash liquor is recycled to the washing zone or rinsing zone for use in a post-wash rinsing step. Again there can also be included a recycle reservoir for storing the cleaned wash liquor prior to recycling. Preferably the method comprises i) one or more feed water or wash liquor treatment steps selected from an electrolysis step wherein the feed water or wash liquor is electrolysed to generate electrolytically-activated wash liquor, a disinfection step wherein the wash liquor or feed water is treated with an antibacterial agent, photocatalyst or UV source, a water softening step wherein the feed water is softened in the water softening zone, and combinations thereof, ii) an optional detergent dispensing step wherein an active detergent product is dosed in a cleaning-effective amount into the wash liquor or into the feed water supply to the washing zone, iii) a washing step wherein the fabrics are contacted with the wash liquor, iv) a wash liquor cleanup and recycle step, v) a fabric enhancer dispensing step wherein a fabric enhancer providing a post-wash fabric care or aesthetic benefit is dosed into the recycled wash liquor, and vi) a rinsing step wherein the fabrics are contacted with the resulting rinse liquor. Suitable fabric enhancers include perfumes and other olfactory agents, textile softening agents, ironing aids, antibacterial agents, anti-pilling aids, etc well-known per se.

In preferred methods of the invention, the washing step is undertaken at a detergent product wash liquor concentration in the range from about 0 to about 2% by weight, preferably from about 0 to about 1% by weight, more preferably from about 0 to about 0.5% by weight, and especially from about 0 to about 0.25% by weight. Typically, however, the detergent product will be present in a cleaning-effective amount, ie. an amount effective to improve the cleaning end-result over and above the end-result that can be achieved in the absence of detergent. Accordingly, the detergent product will normally be present in a level of at least 0.1% by weight of the wash liquor. Suitably the wash liquor pH during the washing step is in the range from about 5 to about 13, preferably from about 6 to about 12, more preferably from about 7 to about 11. In methods comprising the use of detergency enzymes such as proteases, cellulases and amylases, the enzyme concentration during the washing step is preferably from about 0.0001 to about 100 ppm of active enzyme. A non-limiting list of enzymes suitable for use herein is disclosed in, for example, US2002/0155971.

The washing systems of the invention are exemplified as follows.

EXAMPLES

Example 1

A filtration device suitable for use in the washing systems of the invention takes the form of a module as described in general terms hereinabove. The module comprises a filter housing provided with a membrane compartment in which a series of six intercommunicating membrane subunits is mounted, each subunit comprising a bundle of 12 tubular membranes each of about 1.04 m length with a lumen size of about 3 mm providing a total path length of about 75 meters and a total surface area of about 0.5 m$^2$. The tubular membranes are made of an asymmetric polyethersulphone membrane material and have a nominal pore size of about 0.1 μm, a pore size ratio (inner to outer surface) of about 1:10, a surface energy (inner surface) of about 8 dynes/cm, and a Reynold's Number of about 4000 at an operating pressure of 100 kP (1 bar). The device has a clean water flux of about 3000 L/m$^2$.h.100 kp (RO water at 25° C.) and a pressure drop of about 50 kP (0.5 bar).

The filtration device is provided with wash liquor input and permeate and retentate outlet ports, the permeate outlet being in fluid communication with the drum (washing zone) of an automatic front loading laundry washing machine (Miele W360, main wash liquor capacity of about 14 liters, mechanical action corresponding to about 56% stain removal) and the retentate outlet port being in fluid communication with a holding vessel of about 10 liter capacity vented to atmosphere and which acts as wash liquor buffer zone.

In use wash liquor is pumped from the washing machine drum to the holding vessel via a first connecting pipe (first conduit) and is then separately pumped via a second connecting pipe (second conduit) from the holding vessel to the inlet port of the filtration device. The resulting retentate is then recirculated to the holding vessel with permeate being returned to the drum. A pressure relief valve is also provided communicating with the inlet port of the filtration device, excess pressure being relieved by drainage into the holding vessel. Relief valves are also positioned on the retentate outlet and on the outlet side of the holding vessel.

The system is used for washing a typical load of soiled laundry in conjunction with either a liquid or a bleach-containing granular detergent (Ariel Futur) at concentrations in the range from 0.1-0.5 wt %. Wash liquor cleanup and recycling is initiated at a point approximately 60% through the machine's cotton wash cycle. The system and method of Example 1 provides improved cleaning of soiled laundry across the range of detergent usage levels.

In an alternative embodiment, the soiled laundry is subject to a 15 minute prewash in the absence of detergent with simultaneous cleanup and recycling of the wash liquor prior to dispensing of detergent and commencement of the cotton wash cycle. The alternative method again provides improved cleaning of soiled laundry across the range of detergent usage levels.

Example 2

The filtration device of Example 1 is used in conjunction with an appliance comprising means for the ultrasonic treatment of laundry. The appliance takes the form of a front-loading washing machine comprising a drum for accommodating the laundry (washing zone) and which has a plurality of holes in its circumferential wall. The drum is mounted for rotation about a horizontal axis within an outer tub and a drive unit is provided for rotating the drum in forward/reverse directions. Three baffles are ranged equidistantly on the inner circumferential wall parallel to the axis of rotation to provide a tumbling action to the laundry. The drive unit comprises a motor, a motor pulley mounted on the output shaft of the motor, a horizontal drive shaft for the drum extending through the rear wall of the outer tub and rotatably supported by a bearing, a drive pulley mounted on the horizontal shaft, and a drive belt connecting the two pulleys. The appliance also comprises the usual product dispensing, pump, suspension, power, program, heating and temperature control means, as well as the customary feed water inlet and effluent discharge etc. In addition three ultrasonic transducers generating a frequency of 28 kHz are mounted one on each baffle so as to bathe the laundry with ultrasonic energy as the laundry items are lifted out of the bulk wash liquor in contact with the corresponding baffle, the ultrasonic transducers being connected to a power source by means of a sliding contact electrical connector. The drum has a main wash liquor capacity of about 14 liters and the power input to the ultrasonic transducers is about 20 Watts per liter of liquid.

The filtration device is provided with wash liquor input and permeate and retentate outlet ports, the permeate outlet being in fluid communication with the drum of the washing machine and the retentate outlet port being in fluid communication with a holding vessel of 10 liters capacity vented to atmosphere and which acts as wash liquor buffer zone.

In use wash liquor resulting from ultrasonic treatment of soiled laundry is pumped from the washing machine drum to the holding vessel via a first connecting pipe (first conduit) and is then separately pumped via a second connecting pipe (second conduit) from the holding vessel to the inlet port of the filtration device. The resulting retentate is then recirculated to the holding vessel with permeate being returned to the drum. A pressure relief valve is also provided communicating with the inlet port of the filtration device, excess pressure being relieved by drainage into the holding vessel. Relief valves are also positioned on the retentate outlet and on the outlet side of the holding vessel.

The system is used for washing a typical load of soiled laundry either in the absence of detergent or in conjunction with either a liquid or a bleach-containing granular detergent (Ariel Futur) at concentrations in the range from 0.1-0.5 wt %. The laundry is subjected to ultrasonic treatment throughout the main wash cycle of the washing machine. Wash liquor cleanup and recycling is initiated at a point approximately 60% through the main wash cycle. The system and method of Example 2 provides improved cleaning of soiled laundry across the range of detergent usage levels.

In an alternative embodiment, the soiled laundry is subject to a 15 minute prewash in the absence of detergent with simultaneous cleanup and recycling of the wash liquor prior to dispensing of detergent and commencement of the main wash cycle. The alternative method again provides improved cleaning of soiled laundry across the range of detergent usage levels.

Example 3

Example 2 is repeated with an additional ultrasonic transducer of 28 kHz frequency disposed in the conduit on the permeate outlet side of the filtration device. In this case wash liquor cleanup and recycling is initiated together with ultrasonic treatment in the prewash prior to delivery of detergent and again at a point approximately 60% through the main wash cycle. The system and method of Example 3 provides improved cleaning of soiled laundry across the range of detergent usage levels.

Example 4

The filtration device of Example 1 is used in conjunction with an appliance comprising an electrolysis zone for electrolysing the wash liquor. The appliance takes the form of a front-loading washing machine comprising a drum for accommodating the laundry (washing zone) and which has a plurality of holes in its circumferential wall. The drum is mounted for rotation about a horizontal axis within an outer tub and a drive unit is provided for rotating the drum in forward/reverse directions. Three baffles are ranged equidistantly on the inner circumferential wall parallel to the axis of rotation to provide a tumbling action to the laundry. The drive unit comprises a motor, a motor pulley mounted on the output shaft of the motor, a horizontal drive shaft for the drum extending through the rear wall of the outer tub and rotatably supported by a bearing, a drive pulley mounted on the horizontal shaft, and a drive belt connecting the two pulleys. The appliance also comprises the usual product dispensing, pump, suspension, power, program, heating and temperature control means, etc.

The filtration device is provided with wash liquor input and permeate and retentate outlet ports, the permeate outlet being in fluid communication with the drum of the washing machine and the retentate outlet port being in fluid communication with a holding vessel of 10 liters capacity vented to atmosphere and which acts as wash liquor buffer zone.

The electrolysis zone is disposed in the conduit on the permeate outlet side of the filtration device and comprises an electrolysis chamber, a pair of parallel, stainless-steel, plate-shaped electrodes disposed within the chamber and a pair of openings into the chamber to allow wash liquor to flow into and out of the chamber as wash liquor is pumped through the filtration device. Power is provided to the electrodes via a suitable transformer, the power being regulated with the aid of an ammeter to deliver a current of the order of 1 amp. The electrode separation is about 1.5 mm, this close separation being made possible without accumulation of debris or electrode contamination by the location of the electrolysis zone on the outlet side of the filtration device. At the same time, the small electrode separation allows for reduction in the voltage required to deliver the requisite current. In the absence of detergent, the resulting electrolysed water is weakly alkaline and contains hypochlorous ions resulting from electrolysis of chloride ion impurities or deliberately-added chloride salts in the mains water supply.

The system is used for washing a typical load of soiled laundry either in the absence of detergent or in conjunction with a liquid or a bleach-containing granular detergent (Ariel Futur) at concentrations in the range from 0.1-0.5 wt %. Wash liquor cleanup and recycling is initiated together with electrolysis treatment prior to delivery of detergent and again at a point approximately 60% through the main wash cycle. The system and method of Example 4 provides improved cleaning of soiled laundry across the range of detergent usage levels.

In an alternative embodiment, the soiled laundry is subject to a 15 minute prewash in the absence of detergent with simultaneous cleanup and recycling of the wash liquor prior to dispensing of detergent and commencement of the main wash cycle. The alternative method again provides improved cleaning of soiled laundry across the range of detergent usage levels.

Example 5

Example 4 is repeated and in addition, three ultrasonic transducers generating a frequency of 28 kHz are mounted one on each baffle so as to bathe the laundry with ultrasonic energy as the laundry items are lifted out of the bulk wash liquor in contact with the corresponding baffle, the ultrasonic transducers being connected to a power source by means of a sliding contact electrical connector. The drum has a main wash liquor capacity of about 14 liters and the power input to the ultrasonic transducers is about 20 Watts per liter of liquid.

The system is used for washing a typical load of soiled laundry either in the absence of detergent or in conjunction with either a liquid or a bleach-containing granular detergent (Ariel Futur) at concentrations in the range from 0.1-0.5 wt %. The laundry is subjected to ultrasonic treatment throughout the main wash cycle of the washing machine. Wash liquor cleanup and recycling is initiated together with electrolysis prior to delivery of detergent and at a point approximately 60% through the main wash cycle. The system and method of Example 5 provides improved cleaning of soiled laundry across the range of detergent usage levels.

Example 6

The filtration device of Example 1 is used in conjunction with an appliance comprising a zone for disinfecting the wash liquor. The appliance takes the form of a front-loading washing machine comprising a drum for accommodating the laundry (washing zone) and which has a plurality of holes in its circumferential wall. The drum is mounted for rotation about a horizontal axis within an outer tub and a drive unit is provided for rotating the drum in forward/reverse directions. Three baffles are ranged equidistantly on the inner circumferential wall parallel to the axis of rotation to provide a tumbling action to the laundry. The drive unit comprises a motor, a motor pulley mounted on the output shaft of the motor, a horizontal drive shaft for the drum extending through the rear wall of the outer tub and rotatably supported by a bearing, a drive pulley mounted on the horizontal shaft, and a drive belt connecting the two pulleys. The appliance also comprises the usual product dispensing, pump, suspension, power, program, heating and temperature control means, etc.

The filtration device is provided with wash liquor input and permeate and retentate outlet ports, the permeate outlet being in fluid communication with the drum of the washing machine and the retentate outlet port being in fluid communication with a holding vessel of 10 liters capacity vented to atmosphere and which acts as wash liquor buffer zone.

The disinfection zone is disposed in the conduit on the permeate outlet side of the filtration device and comprises an electrolysis chamber, three parallel plate-shaped electrodes disposed within the chamber and which consist of a silver anode and two stainless-steel cathodes on either side thereof, and a pair of openings into the chamber to allow wash liquor to flow into and out of the chamber as wash liquor is pumped through the filtration device. Power is provided to the electrodes via a suitable transformer delivering direct current at about 6 volts, the power being regulated with the aid of an ammeter. The electrode separation is about 3 mm, this close separation being made possible without accumulation of debris or electrode contamination by the location of the disinfection zone on the outlet side of the filtration device. The disinfection zone is effective to release silver ions into the wash liquor and to deliver bacteriostatic control.

In an alternative embodiment, the two stainless-steel cathodes are replaced by silver cathodes, a 10 kHz square wave pulse is applied to the electrodes superimposed over the DC current, and the polarity of the electrodes is reversed at 1.5 sec intervals. The result is a cyclical process whereby positively charge silver particles move from the anode towards the cathode to be attached to the cathode and on polarity reversal, the attached positively charged silver particles are repelled to form a silver colloidal dispersion.

The system is used for washing a typical load of soiled laundry either in the absence of detergent or in conjunction with either a liquid or bleach-containing granular detergent (Ariel Futur) at concentrations in the range from 0.1-0.5 wt %. Wash liquor cleanup and recycling is initiated together with disinfection treatment prior to delivery of detergent and again at a point approximately 60% through the main wash cycle. The system and method of Example 6 provides improved cleaning of soiled laundry across the range of detergent usage levels.

Example 7

Example 6 is repeated and in addition, three ultrasonic transducers generating a frequency of 28 kHz are mounted one on each baffle so as to bathe the laundry with ultrasonic energy as the laundry items are lifted out of the bulk wash liquor in contact with the corresponding baffle, the ultrasonic transducers being connected to a power source by means of a sliding contact electrical connector. The drum has a main wash liquor capacity of about 14 liters and the power input to the ultrasonic transducers is about 20 Watts per liter of liquid.

The system is used for washing a typical load of soiled laundry either in the absence of detergent or in conjunction with either a liquid or a bleach-containing detergent (Ariel Futur) at concentrations in the range from 0.1-0.5 wt %. The laundry is subjected to ultrasonic treatment throughout the main wash cycle of the washing machine. Wash liquor cleanup and recycling is initiated together with disinfection treatment prior to delivery of detergent and at a point approximately 60% through the main wash cycle. The system and method of Example 7 provides improved cleaning of soiled laundry across the range of detergent usage levels.

Example 8

The filtration device of Example 1 is used in conjunction with an appliance comprising a zone for softening the feed liquor. The appliance takes the form of a front-loading washing machine comprising a drum for accommodating the laundry (washing zone) and which has a plurality of holes in its circumferential wall. The drum is mounted for rotation about a horizontal axis within an outer tub and a drive unit is provided for rotating the drum in forward/reverse directions. Three baffles are ranged equidistantly on the inner circumferential wall parallel to the axis of rotation to provide a tumbling action to the laundry. The drive unit comprises a motor, a motor pulley mounted on the output shaft of the motor, a horizontal drive shaft for the drum extending through the rear wall of the outer tub and rotatably supported by a bearing, a drive pulley mounted on the horizontal shaft, and a drive belt connecting the two pulleys. The appliance also comprises the usual product dispensing, pump, suspension, power, program, heating and temperature control means, etc.

The filtration device is provided with wash liquor input and permeate and retentate outlet ports, the permeate outlet being in fluid communication with the drum of the washing machine and the retentate outlet port being in fluid communication with a holding vessel of 10 liters capacity vented to atmosphere and which acts as wash liquor buffer zone.

The water softening zone is disposed between feed supply and the washing zone and comprises an electrodeionisation device marketed by Sabrex under the trade name Mini EWP.

The system is used for washing a typical load of soiled laundry either in the absence of detergent or in conjunction with either a liquid or bleach-containing granular detergent (Ariel Futur) at concentrations in the range from 0.1-0.5 wt %. Wash liquor cleanup and recycling is initiated together with disinfection treatment prior to delivery of detergent and again at a point approximately 60% through the main wash cycle. The system and method of Example 8 provides improved cleaning of soiled laundry across the range of detergent usage levels.

What is claimed is:

1. A washing system for use in cleaning or washing a soiled substrate or substrates, the system comprising:
   a. a washing zone for contacting and washing the soiled substrate with wash liquor;
   b. a feed supply for providing hot or cold feed water to the washing zone;
   c. a wash liquor cleanup and recycle zone in fluid communication with the washing zone wherein the wash liquor cleanup and recycle zone comprises a means for recycling the wash liquor from the washing zone;
   d. an effluent storage and/or discharge zone;
   e. means for sonically or ultrasonically treating the soiled substrate in the washing zone or in a washing pre-treatment zone;
   f. an electrolysis zone comprising a feed water electrolysis means and a wash liquor electrolysis means; and
   one or more of:
   g. a product dispensing zone;
   h. a wash liquor disinfection zone; and
   i. a feed water softening zone; and
   wherein the wash liquor cleanup and recycle zone comprises an ultrafiltration or microfiltration device comprising one or more tubular membranes and having a cut-off in the range from about 1000 Daltons to about 1 μm, a lumen size of from about 1 to about 10 mm, and a clean water flux of at least about 1000 L/m².h.100 kp (RO water at 25° C.); and
   wherein the means for sonically or ultrasonically treating the soiled substrate in the washing zone or in a washing pre-treatment zone comprises one or more vibrating cleaning transducers for physically contacting one or more surfaces of the soiled substrate.

2. A washing system according to claim 1 wherein the ultrafiltration or microfiltration device has a cut-off in the range from about 0.05 μm to about 0.5 μm, a lumen size of from about 2 to about 6 mm, and a clean water flux of at least about 10,000 L/m².h.100 kp (RO water at 25° C.).

3. A washing system according to claim 2 wherein the wash liquor cleanup and recycle zone comprises a cross-flow filtration device comprising one or more free-standing, asymmetric, tubular filtration membranes, each having a lumen size in the range from about 3 to about 5 mm and a Reynold's Number of at least about 4000 at an operating pressure in the range from about 100 to about 1000 kP (1-10 bar), and wherein the wash liquor cleanup and recycle zone is effective to lower the turbidity of the recycled wash liquor to less than about 15 NTU with a permeate flux of at least about 100 L/h at an operating pressure in the range from about 100 to about 1000 kP (1-10 bar).

4. The washing system of claim 1, further comprising a product dispensing zone, a wash liquor disinfection zone, and a feed water softening zone.

5. The washing system of claim 1, further comprising a product dispensing zone and a wash liquor disinfection zone.

6. The washing system of claim 1, further comprising a product dispensing zone and a feed water softening zone.

* * * * *

UNITED STATES PATENT AND TRADEMARK OFFICE
CERTIFICATE OF CORRECTION

| | | |
|---|---|---|
| PATENT NO. | : 7,950,254 B2 | Page 1 of 1 |
| APPLICATION NO. | : 11/130538 | |
| DATED | : May 31, 2011 | |
| INVENTOR(S) | : Peter Gerard Gray et al. | |

It is certified that error appears in the above-identified patent and that said Letters Patent is hereby corrected as shown below:

Column 3
Line 15, delete "10" and insert -- 1 --.

Signed and Sealed this
Thirteenth Day of March, 2012

David J. Kappos
*Director of the United States Patent and Trademark Office*